`United States Patent Office`

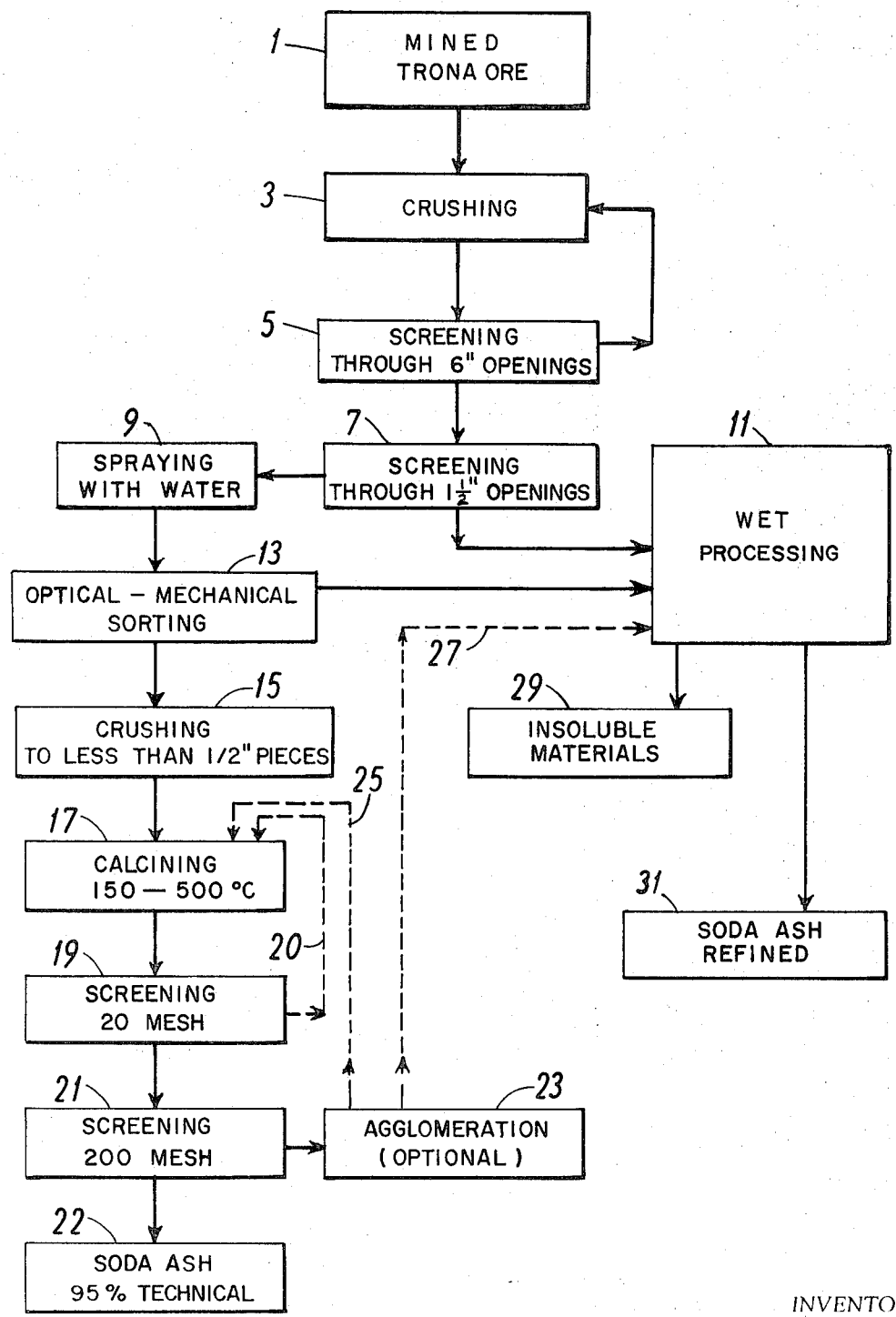

3,819,805
Patented June 25, 1974

3,819,805
PROCESS FOR THE PREPARATION OF SODA ASH FROM TRONA ORE
Charles A. Graves, New Woodstock, and Peter Sopchak, Liverpool, N.Y., assignors to Allied Chemical Corporation, New York, N.Y.
Filed Apr. 14, 1971, Ser. No. 133,996
Int. Cl. C01d 7/12, 7/24
U.S. Cl. 423—206    15 Claims

ABSTRACT OF THE DISCLOSURE

A process for beneficiating trona ore for producing soda ash, which comprises crushing the ore, separating the ore by optical-mechanical sorting means, recovering the desired trona ore fraction and converting said beneficiated fraction to soda ash by calcination.

---

Naturally occurring trona is found in Wyoming and other parts of the world. The trona deposits in Southwestern Wyoming are found at a depth of 900 to 1800 feet and often consist of a main stratified trona bed which may be from 7 to 13 feet thick, together with other beds of smaller thicknesses. The trona strata consist mainly of sodium sesquicarbonate ($Na_2CO_3 \cdot NaHCO_3 \cdot 2H_2O$) containing about 4 to 15% by weight of insoluble impurities comprises oil shales, shortite ($Na_2CO_3 \cdot 2CaCo_3$), and miscellaneous sedimentary materials, so that the percent of insoluble impurities varies throughout the trona bed. In the typical trona bed the strata are of distinguishably different colors, which for convenience we characterize as white, tan, green, gray and black.

Many industries, such as the glass industry, which is a major consumer of dense soda ash, do not always require a highly refined grade soda ash (greater than 99% basis sodium carbonate). Primarily, the glass industry requires a soda ash of consistent purity having a bulk density greater than about 50 lbs. per cubic foot. Furthermore, the industry requires a soda ash which will not dust, is free-flowing, and has a particle size which makes it compatible with the sands used. Free-flowing soda ash is required to facilitate handling and to adapt it to automatic weighing equipment. There must be little or no dusting during addition of the soda ash to the melting furnaces, as dust tends to transfer to the furnace checker work causing a decrease in furnace life.

In the manufacture of clear glass, the major raw materials other than soda ash are feldspar, nephelite, sand and lime, which are substantially the same impurities associated with crude trona. However, soda ash from crude unbeneficiated calcined trona cannot be used in the glass industry because the impurities vary and products of consistent quality cannot be obtained.

Various methods have been used to obtain dense soda ash from crude trona. In a sesquicarbonate process producing soda ash, mined trona is crushed to about 8 mesh and dissolved in a hot recirculating trona mother liquor carrying more normal carbonate than bicarbonate so that the sodium carbonate and bicarbonate in the mined trona are both dissolved. The insoluble material is settled out of the solution in clarifiers and the solution polished by filtration. Sodium sesquicarbonate is crystallized and separated from the hot solution, then calcined to soda ash. The mother liquor remaining after the crystallization can be recycled to the dissolving tanks to dissolve more crude trona and/or a portion of the mother liquor is passed to the crystallizers to form a second crop of sodium sesquicarbonate crystals. This processing route contains several drawbacks. There is the need for maintaining the carbonate-bicarbonate ratio in the recycling mother liquor, and the relatively low concentration of salts per unit of solution entails the use of costly large scale processing equipment to recover the sequicarbonate. Sequestrants are required to facilitate filtration, and crystallizing aids are used to provide particles of the desired size and shape. These additives may contaminate the product. Furthermore, the processing equipment required substantially adds to the cost of the final product. See for instance U.S. Pats. Nos. 2,346,140; 2,639,217; 2,798,790; and 3,028,215.

In the usual monohydrate route to soda ash the mined trona is crushed, calcined, dissolved in an aqueous solution, clarified and filtered. The clear filtered solution is then evaporated to form sodium carbonate monohydrate crystals which are separated from the mother liquor. This mother liquor may be recycled to the crystallizers or a portion may be returned to dissolve more calcined trona. The monohydrate crystals are then calcined to dense ash. This route for producing soda ash for use in glass manufacture has some drawbacks, among them being the heavy evaporation load with corresponding high capital cost for evaporative equipment. Also, the substantial amounts of equipment required for this type of process addes to the cost of the final product. See, for instance, U.S. Pats. Nos. 2,343,080; 2,343,081; 2,962,348; 3,131,996 and 3,260,567.

Another method for the processing of trona includes the preparation of anhydrous sodium carbonate by maintaining the crystallization temperature in the crystallization units above about 109° C., which is the transition temperature at which anhydrous sodium carbonate is formed as the stable crystal phase. See U.S. Pat. No. 2,770,524. Still another method involves the preparation of sodium bicarbonate which in turn may be calcined and converted to dense sodium carbonate. This type of procedure is disclosed in U.S. Pat. No. 2,704,239.

In all of the above processing techniques there is involved dissolution, clarification, filtration and crystallization procedures requiring substantial amounts of complicated equipment which substantially add to the cost of the final product.

An object of the present invention is to provide a process for the benefication of trona ore. Another object of this invention is to provide a simple and inexpensive process for the production of soda ash of consistent quality from crude trona.

A further object of the present invention is to provide a simplified process for the production of a technical grade of soda ash of adequate purity (greater than 95% basis sodium carbonate) to meet the needs of the glass industry.

A still further object of the present invention is to provide a process for the production of soda ash of consistent quality from crude trona with a minimum of equipment.

It has now been found that the quality of natural trona, and particularly the presence therein of large or small amounts of insoluble matter, is related to the color of the trona in the stratified layers and, therefore, to the color or to the amount of reflectivity of the pieces of ore which are mined from such statified beds. The white and tan fractions of natural trona, for instance, contain relatively little insoluble matter, whereas the black oil shale is almost entirely composed of insoluble matter. The light brown trona is of greater purity than the dark brown variety, but the green, and particularly the gray materials, contain substantially more insoluble matter as a rule than the brown. It can be seen then, that if the pieces of mined trona are selected by color, the purity of the soda ash obtainable therefrom can be selectively controlled. If, for example, the white, tan and light brown pieces are separated from the dark brown, green, gray and black pieces, and the former pieces are subsequently calcined, a dense soda ash of comparatively high assay and containing relatively little insoluble matter is obtained.

It has also been found, surprisingly, that in general if trona ore is suitably crushed, and screened to separate the fines from the larger pieces of ore, the percentage of insoluble material in the fines will considerably exceed that contained in the larger pieces of ore. In other words, screening of such crushed ore results in considerable beneficiation, and as the particle size increases, the percent of insoluble material tends to decrease. Although the contaminating mineral shortite is essentially white, it is insoluble in water. By far the greater portion of this contaminant is removed by the screening procedure. In samples which were screened on an 8 mesh sieve, the percentage of insoluble material was found to be appreciably higher in the fines than in the coarser particles which remained on the screen. Only in the case of the brown-colored fraction has it been found that screening does not appreciably beneficiate the remaining trona. Essentially all of the insolubles of the brown trona fraction are finely dispersed in this thicker layered ore, hence screening of this crushed fraction does not substantially improve its quality. This disparity in behavior is explained by the fact that much of the insoluble material responsible for the darker colored fractions of the ore, such as the gray and green fractions, occur as thin strata interleaved with the thicker ore layers. This thin, brittle material cleaves away and breaks up, in the mining and crushing steps, even though the contaminating shale contained therein is approximately equal in hardness to the trona.

It has also been observed that when selected light colored trona is dissolved in water, either before or after the calcination step, the greater part of the remaining insoluble material was extremely light and colloidal in character. It therefore remains suspended in the saturated solution and may be removed by any one of the several conventional methods, as for example, that disclosed in U.S. Pat. No. 3,425,795. In the latter disclosure, finely divided trona ore is introduced into a crystallizer containing an aqueous slurry of water-insoluble impurities and sodium carbonate monohydrate seed crystals, said crystallizer being maintained at a temperature preferably between 92–97° C. under non-evaporative conditions to crystallize the monohydrate. The product slurry from the crystallizer containing 30 to 60% suspended solids, primarily sodium carbonate monohydrate and insoluble material, is passed into a vertical columnar separator wherein the monohydrate crystals settle to the bottom of the separator and are removed, but the light colloidal insoluble impurities move upward with the flow of the mother liquor and are removed from the system.

The present invention relates to a process for the beneficiation of trona ore which comprises:

a. mining the trona ore;
b. crushing the mined trona; and
c. beneficiating the selected fractions of ore by optically sorting the ore according to a variable standard of reflectivity, transmission or absorption of electromagnetic radiation of selected wavelength or wavelengths, or to a variable standard of fluorescence, resulting from excitation of the surface of the ore, induced by any selected wavelength or wavelengths or said radiation, in such a manner that the ore is thereby divided into two fractions, one of which has the quality desired.

The quality of the beneficiated trona ore obtained by the above procedure varies with the color standard chosen. Thus, when the pieces selected are limited to those which may be classified as white, tan or light brown, the soda ash obtained therefrom, merely by calcining, would normally be found to assay greater than 95%, usually 98% or more, sodium carbonate. Such high grade material on the average will constitute about 60% or more of the trona ore in the mined face. Increased yields can be obtained by slightly varying the standard of selectivity to give a technical grade of soda ash assaying about 95% $Na_2CO_3$, which grade may be suitable for the manufacture of glass as well as for the many other uses of technical grade soda ash.

According to the present invention, trona ore is mined by conventional techniques and then crushed into pieces which are roughly 6 inches in diameter or less. The fines including all pieces less than ½ inch in diameter, preferably less than 1½ inches in diameter, are removed from that portion which is to be further processed according to this invention. The selected pieces, which now vary between about ½ inch and 6 inches in diameter, are wet with an aqueous solution, such as water or a solution containing dissolved trona or sodium carbonate in order to define more distinctly the desired optical characteristics of the trona ore by reducing light scattering from its surface, thereby sharpening the contrast between the darker and lighter colored pieces, and by rinsing away the usual mask of adhering dust. It has been found that the wet pieces vary in color from white to black through shades of light to dark brown, green and gray. The separation or classification of the desired trona ore fractions, by optical sorting means, according to color or reflectivity can be done either by visual selection or optical-mechanical means.

Photoelectric sorting is not new, and there are devices on the market wherein an illuminated object can be scanned by a photoelectric cell which then activates means for classifying the article by color or by the degree of reflectivity. Such optical sorting devices have been found suitable for separating a relatively pure ore fraction where its color, its reflectivity or its fluorescent response to ultraviolet light bears a relationship to the relative purity of the material. For instance, if it is determined that the white and/or light brown fractions are to be retained for further processing by the method of this invention, the dark brown, green, gray, black or any intermediate shade fractions are removed and may be combined with the fines and processed to soda ash by one of the aforementioned conventional processing means. The separation of these white and/or light brown fractions from the remainder of the material by optical sorting permits the recovery of relatively pure trona ore by correlation of the reflectivity of the ore to its relative purity. The discriminating element may be sensitive to reflected, transmitted (or the partial absorption of) electromagnetic radiation, or to the nature of any fluoresence which results from the impingement of such radiation on the piece or pieces of trona ore. Preferably, the ore is illuminated by ultraviolet or visible light and the illuminated piece is scanned by a photoelectric device which responds to the color, fluorescence, and/or the degree of reflectivity of the ore. This response activates mechanical means for separating the desired fraction such as the white and light brown pieces, from the dark brown, green, gray and black, or makes any other predetermined selection, so that the white and light brown pieces are accepted for further processing according to the method of this invention. The remaining darker colored pieces are set aside generally for combination with the fines, as previously mentioned, and then processed by conventional wet processing means to produce a better-than-technical grade of soda ash.

The selected fraction such as the white and light brown pieces are crushed so that all particles are now less than ½ inch in diameter, then this crushed trona fraction is calcined at temperatures between 150° and 500° C. The calcined trona, which is now sodium carbonate or soda ash, is then screened to removed fines and the product which is recovered has a particle size between about 20 and 200 mesh (Tyler). The particles remaining on a 20 mesh screen are generally returned to the calciner or crushed and then screened. The fines passing through the 200 mesh screen may be reconstituted and returned to the process. The final free-flowing dense soda ash with the fines removed constitutes the technical grade soda ash containing at least about 95% sodium carbonate, which generally meets the requirements of the glass industry.

Reference is made to the figure which illustrates diagrammatically one way in which the process of this invention may be employed. Referring to this figure, trona ore 1 as received from the mine is crushed into small pieces in crusher 3 to such size as to pass through screen 5 having six inch openings or through perforations approximately six inches in diameter. Any pieces remaining on screen 5 are returned to crushing operation 3 for further crushing and recycled back to screen 5. Pieces passing screen 5 continue on to screen 7 having perforations of from ½ to 2 inches, preferably about 1½ inches. The fines and small pieces passing through screen 7 are directed to a typical wet process system 11 wherein they may be treated according to any of the aforementioned established processes. The high grade trona ore fraction selected for further processing by the method of the present invention (wherein the trona ore pieces now vary between about 1½ inches to 6 inches in diameter and are of various colors and shades), pass to sprayer 9 wherein the ore surfaces are wetted with an aqueous solution to define more distinctly the optical differences among the lumps of ore. Next, the pieces pass through an optical-mechanical sorting means 13, such as the Sortex optical separators Model Nos. 711M and 811M (manufactured by the Sortex Co. of North America Inc., Lowell, Mich.). Other sorting devices which may be used are disclosed in U.S. Pat. Nos. 3,066,797 and 3,305,089.

In a typical operation, the particles to be sorted are drawn from a storage hopper by a vibrating feeder which then delivers them to a vibrating accelerating chute on their way to a rotary aligning disc. The particles are aligned on this disc in single file and are discharged into the V trough of the feed conveyor belt system for separate delivery at uniform speed to the particle inspection unit. This inspection unit may comprise an optical chamber in which the particles are inspected by three camera units while strongly illuminated. At this stage, the machine determines whether a given particle should be accepted in the main stream or diverted to the wet processing operation 11. This diversion is accomplished, for instance, by blasts of air from high speed air valves, whereupon the resulting two product streams are separated by a dividing edge.

The optical sorting device is preadjusted to accept only the trona fraction which will give the desired quality soda ash product. Preferably, for producing technical grade ash, the white and/or light brown colored fractions are recovered. Various color comparison standards can be used in the device, and its sensitivity may be adjusted to permit the acceptance of lighter or darker colored material. The final sensitivity adjustments will be based on the chosen analytical standard for the final technical soda ash product and also on the percentage of the total quantity of mined trona which is acceptable for the production of this technical grade material. Obviously, as the quality of the beneficiated product is increased, the fraction of the material diverted to this use is diminished, and the fraction of the trona not acceptable for this method of processing which is diverted to the usual wet processing methods is increased.

The accepted pieces leaving the optical sorter 13 are crushed in crusher 15 to ½" in diameter or less, then calcined to convert the ore to sodium carbonate by passage through a calcining furnace 17. Since a free-flowing product is required by the gass industry, the calcined material passes through screen 19 for removal of coarse particles over 20 mesh, which may be returned to the calciner 17 via line 20. The particles passing through the 20 mesh screen are passed to screening operation 21 at which point the fines which are in the order of 200 mesh or less may be diverted either to the wet processing operation 11 via line 27 or agglomerated at 23 preferably by the use of water or carbonate solution, then recycled via line 25 to calciner 17. Screens 19 and 21 will, of course, be chosen so as to provide a screen size to suit market requirements. The material remaining on screen 21 constitutes the 95% technical grade soda ash product. By far the greatest part of the insoluble matter in the original mined trona is diverted to the wet processing unit 11 as a result of the beneficiation obtained in the screening step 7 and the further beneficiation obtained by the optical-mechanical sorting means 13. By working up these crude materials by conventional methods 11, the insoluble material is discarded at 29, and the final product 31, while of higher purity, is more costly than that desired by the glass industry.

In order to better understand the operation of the present invention, the following examples are offered.

EXAMPLE 1

A 6.4 kilo composite sample of mined raw trona varying in color from white through gray to brown is divided by screening into seven fractions by size. The first fraction having too few lumps, too disparate in size to permit a meaningful sort, and the seventh consisting of unsortable fines. These seven fractions are characterized by number, size, and screen size as follows:

TABLE I

| Fraction number | 1 | 2 | 3 | 4 | 5 | 6 | 7 |
|---|---|---|---|---|---|---|---|
| Range, particle size, in | (¹) | 0.63–1.04 | 0.37–0.62 | 0.26–0.36 | 0.13–0.25 | 0.06–0.12 | (²) |
| Percent by weight | 3.40 | 6.49 | 21.57 | 9.65 | 17.44 | 13.89 | 27.56 |

¹ 1.05" and larger.   ² 0.06" and smaller.

An aliquot portion of fraction No. 2 is then visually sorted, first dry, then wet, using the color of brown kraft wrapping paper as a standard for the "brown" sort. A distinction is also made between gray and white pieces, thus dividing the original aliquot portion into three groups according to color. The percent of insolubles in each of these groups is then determined by dissolving the selected pieces of each group in water, filtering, then drying and weighing the insoluble residue which remains. The results are recorded in Table II below:

TABLE II

| | Percent | | | |
|---|---|---|---|---|
| | Wet sorting | | Dry sorting | |
| Fraction number 2 | Weight distribution | Insolubles | Weight distribution | Insolubles |
| "Brown" | 15.61 | 19.89 | 13.59 | 22.68 |
| "Gray" | 21.93 | 6.66 | 15.24 | 7.50 |
| "White" | 62.46 | .768 | 71.17 | 1.06 |

It can be seen from the data in Table II that the light fractions of the trona which has been wetted contains less insoluble material than the corresponding fractions of the trona which remains dry, thus indicating that wetting the pieces of trona prior to sorting optimizes the sorting, thus providing a final product having a minimal amount of insoluble matter.

Fractions 2 through 6 are similarly sorted on a wet basis, and the insoluble matter determined as before for the various sort-groups of each fraction. These data are recorded in Table III below.

TABLE III

| Fraction | 2 | 3 | 4 | 5 | 6 |
|---|---|---|---|---|---|
| "Brown", percent: | | | | | |
| Weight distribution | 15.6 | 29.3 | 16.6 | 18.4 | 10.0 |
| Insoluble | 19.9 | *14.6 | 19.1 | *27.19 | 21.42 |
| "Gray", percent: | | | | | |
| Weight distribution | 21.9 | 29.2 | 26.1 | 23.5 | 18.3 |
| Insoluble | 6.66 | *14.6 | 27.9 | *27.19 | 54.41 |
| "White", percent: | | | | | |
| Weight distribution | 62.5 | 41.5 | 57.4 | 58.1 | 71.7 |
| Insoluble | 0.77 | .92 | 1.17 | 1.13 | 3.76 |

*Combined "brown" and "gray".

From the data in Table III it may be seen that considerable beneficiation of the trona ore is obtained by screening, since for each color, and especially for "white" and "gray," the amount of insoluble material is greater in the smaller particles (0.06 to 0.12" of fraction No. 6), than in the larger particles (0.63 to 1.04" of fraction No. 2). It is interesting and significant that this effect is not nearly as clearly defined for the brown fraction as it is for the gray and white fractions. From these data it must be concluded that the trona ore can be beneficiated visually to a considerable degree solely on the basis of color, and that those fractions containing the desired sodium carbonate values may be calcined and sold as technical grade soda ash.

EXAMPLE 2

Mined trona from Green River, Wyo., is broken into 2" piece or less, screened through 2" opening, 1½" openings and 1" openings. Three portions of the material retained on the 1½" screen varying from 25.5 to 39 lbs. is held for test runs identified as Runs A, C and F. Three portions of the material retained on the 1" screen, varying from 29 to 34 lbs. is held for test runs identified as Runs B, D and G. All portions are sampled, and determinations made of the percent insolubles. Each of the eight portions are then wetted and hand fed into an optical-mechanical sorter (Model No. 711M-Sortex Co. of North America), which is internally adjustable to various standards and levels of optical discrimination. A quartz iodine lamp is employed as the source of light and the sorter is adjusted so that a portion of each charge is accepted as above on the basis of the selected color standard. The rejected material from Run C is recharged back into the optical sorter as the feed stock for Run E and the rejected material from Run F recycled as feed stock for Run H. Finally, the rejected ore from Runs A, B, D, E, G and H is passed to a conventional wet processing unit for the preparation of high purity soda ash. No optical filters are employed in this Sortex unit.

The data obtained in these runs are tabulated below in Table IV.

EXAMPLE 3

4,100 tons of Green River, Wyo. trona containing about 8.5% insoluble matter are crushed to 6" pieces or less, and screened. 2,010 tons, or 49% of the original charge, passes through 6" openings, but remains on a screen with 2" openings. 2,090 tons (51%) of "fines," passing through the 2" openings, are sampled and found to contain about 8.6% insoluble matter. This portion of the original charge is held for processing to refined soda ash by one of the conventional monohydrate methods described above. The 2,010 tons of 2" to 6" pieces are wet with an aqueous spray and fed into an optical sorter (Model No. 811M Sortex Co.). For a color standard, the brown color of kraft wrapping paper is chosen.

The optical sorter rejects 945 tons of dark trona containing 16.4% insoluble matter and accepts 1,065 tons of light colored trona containing 1.45% insoluble matter. The rejected portion is combined with the "fines' previously obtained from the first screening operation.

The selected trona fraction is next crushed to about 8 mesh or less, with oversized material being recycled to the crusher. The crushed material passes through a rotary calciner maintained at a temperature of about 225° C., and is then screened to remove fines (less than about 150 mesh). The material remaining on the screen is retained as final product, whereas the fines are compacted using water and recycled to the calciner. By this method 750 tons of technical grade soda ash are obtained having a bulk density of about 62 lbs. per cubic foot. Particle size: less than 3% remains on a 30 mesh Tyler sieve, and less than 20% passes 140 mesh. The product soda ash assays 98%, sodium carbonate basis.

Although certain preferred embodiments of the invention have been disclosed for purposes of illustration it will be evident that various changes and modifications may be made therein without departing from the spirit and scope of this invention.

What is claimed is:

1. A process for preparing a technical grade soda ash from trona ore which comprises the steps of:

TABLE IV

| Test | Sorting criteria | Pieces, in. | Pounds | | | Weight percent insolubles | | |
|------|------------------|-------------|--------|---------|---------|-----------|------------------|------------------|
|      |                  |             | Feed   | Accepts | Rejects | Feed stock | Accepted material | Rejected material |
| A | Accepts all but black | 1½-2 | 39 | 37.5 | 1.5 | 12.4 | 9.3 | 91.7 |
| B | do | 1-1½ | 29 | 28 | 1 | 10.3 | 8.2 | 67.3 |
| C | Accepts max. brown and white | 1½-2 | 34.5 | 24 | 10.5 | 10.1 | 3.9 | 24.2 |
| D | do | 1-1½ | 34 | 24.5 | 9.5 | 9.7 | 3.0 | 26.6 |
| E | Accepts intermediate brown and green from C rejects | 1½-2 | 10.5 | 8 | 2.5 | 24.2 | 16.4 | 48.3 |
| F | Accepts light brown and white | 1½-2 | 25.5 | 13.5 | 12 | 8.4 | 0.8 | 16.9 |
| G | do | 1-1½ | 31 | 18.5 | 12.5 | 7.0 | 1.4 | 15.1 |
| H | Accepts intermediate brown and green from F rejects | 1½-2 | 12 | 7 | 5 | 16.9 | 9.1 | 27.6 |

Several conclusions can be drawn from the data of these runs. In Runs A and B when the optical sorter is set to remove only the black material, a relatively large percentage of insoluble matter remains with the accepted trona, but the predominantly insoluble black material is removed. Such a separation applied to trona ore to be purified by conventional wet processing means, would prevent black oil shale from entering the dissolving step, thereby lessening the organic adsorption and insolubles handling load of such systems.

Runs B, D and G made with smaller pieces of trona than Runs A, C, E, F and H confirm the findings of Example 1, that is, that the smaller pieces and fines carry more than a proportionate amount of insoluble matter.

The trona ore is significantly beneficiated by optical sorting in all tests. The pure ore fractions accepted (Runs F and G) are capable of being used to prepare a technical grade soda ash product having an assay of better than 95% sodium carbonate, without the complications of conventional wet processing methods. This is considerably better than the 95% minimum generally required in glass manufacture.

a. mining the trona ore;
b. crushing the mined trona ore to particles of less than 6" in diameter;
c. removing particles smaller than about ½ inch from the crushed trona ore;
d. wetting the surface of the remaining trona ore particles with an aqueous solution to more distinctly define the optical differences of the particles;
e. separating desired from undesired trona ore particles which vary in light reflecting properties according to a preset variable optical standard, by subjecting said ore to optical-mechanical sorting means to selectively deflect the ore into said desired and undesired fractions of light and darker colors according to the preselected optical standard; and
f. calcining the desired ore fraction, said calcination being conducted at a temperature of 150° to 500° C., to convert the trona to sodium carbonate containing greater than 95% by weight of sodium carbonate values.

2. The process of claim 1 wherein the optical-mechanical sorter employs electromagnetic radiation and the classification of the ore is based on the degree of reflectivity of the ore.

3. The process of claim 2 wherein the electromagnetic radiation is confined within the range of ultraviolet, infrared and visible light.

4. The process of claim 1 wherein the optical-mechanical sorter employs electromagnetic radiation and the classification of the ore is based on the color of the ore.

5. The process of claim 1 wherein the optical-mechanical sorter employs electromagnetic radiation and the classification of the ore is based on the degree of transmissability of said radiation through the ore.

6. The process of claim 1 wherein the sorter employs a photoelectric viewing means to view the reflected light from the surface of said ore.

7. The process of claim 1 wherein the undesired trona fraction is converted to purified carbonate crystals by a wet crystallization procedure, said crystals being selected from the group consisting of sodium sesquicarbonate and sodium carbonate monohydrate.

8. The process of claim 1 in which the undesired fraction comprises essentially black colored trona ore particles.

9. The process of claim 1 wherein the desired fraction comprises the white to brown colored fraction of the trona ore.

10. The process of claim 1 wherein the desired fraction comprises the white colored fraction of the trona ore.

11. The process of claim 1 wherein the variable color standard is selected to correspond to the recovery of trona ore containing less than 5% insoluble material naturally occurring with said ore.

12. The process of claim 1 wherein the variable color standard is selected to correspond to the recovery of trona ore containing less than 3% soluble material naturally occurring with said ore.

13. The process of claim 1 wherein the variable color standard is selected to correspond to the recovery of trona ore containing less than 2% insoluble material naturally occurring with said ore.

14. The process of claim 1 wherein the optical-mechanical sorter employs sensing elements responsive to variation in the color and the intensity of fluorescence resulting from the impingement of electromagnetic radiation on the surface of the trona ore within the range of violet and ultraviolet light, which variation bears a relationship to the physical characteristic of the fluorescing piece.

15. The process of claim 1 including removing particles smaller than about 1½ inches from the trona ore after crushing said ore and before subjecting said ore to said optical-mechanical sorting means.

References Cited

UNITED STATES PATENTS

| | | | |
|---|---|---|---|
| 3,097,744 | 7/1963 | Hutter et al. | 209—111.6 |
| 3,356,211 | 12/1967 | Mathews | 209—111.5 |
| 3,479,133 | 11/1969 | Warzel | 23—63 |
| 3,479,134 | 11/1969 | Warzel | 23—63 |
| 3,486,844 | 12/1969 | Tabler | 23—63 |
| 2,770,520 | 11/1956 | Seaton et al. | 423—421 |
| 3,211,519 | 10/1965 | Roberts et al. | 423—425 |

OSCAR R. VERTIZ, Primary Examiner

J. COOPER, Assistant Examiner

U.S. Cl. X.R.

209—111.6, 111.7; 423—427

PO-1050
(5/69)

UNITED STATES PATENT OFFICE
CERTIFICATE OF CORRECTION

Patent No. 3,819,805        Dated June 25, 1974

Inventor(s) Charles A. Graves and Peter Sopchak

It is certified that error appears in the above-identified patent and that said Letters Patent are hereby corrected as shown below:

Column 1, line 26, "157" should be --15%--;

line 27, "comprises" should be --comprising--;

line 32, after "tan," insert --brown,--.

Column 2, line 20, "addes" should be --adds--.

Column 5, line 72, "gass" should be --glass--.

Column 7, line 18, "piece" should be --pieces-- and "opening" should be --openings--.

Column 8, line 19, " "fines' " should be --"fines"--.

Claim 1, column 8, line 67, "light" should be --lighter--.

Signed and sealed this 24th day of December 1974.

(SEAL)
Attest:

McCOY M. GIBSON JR.          C. MARSHALL DANN
Attesting Officer            Commissioner of Patents